Figure 1:
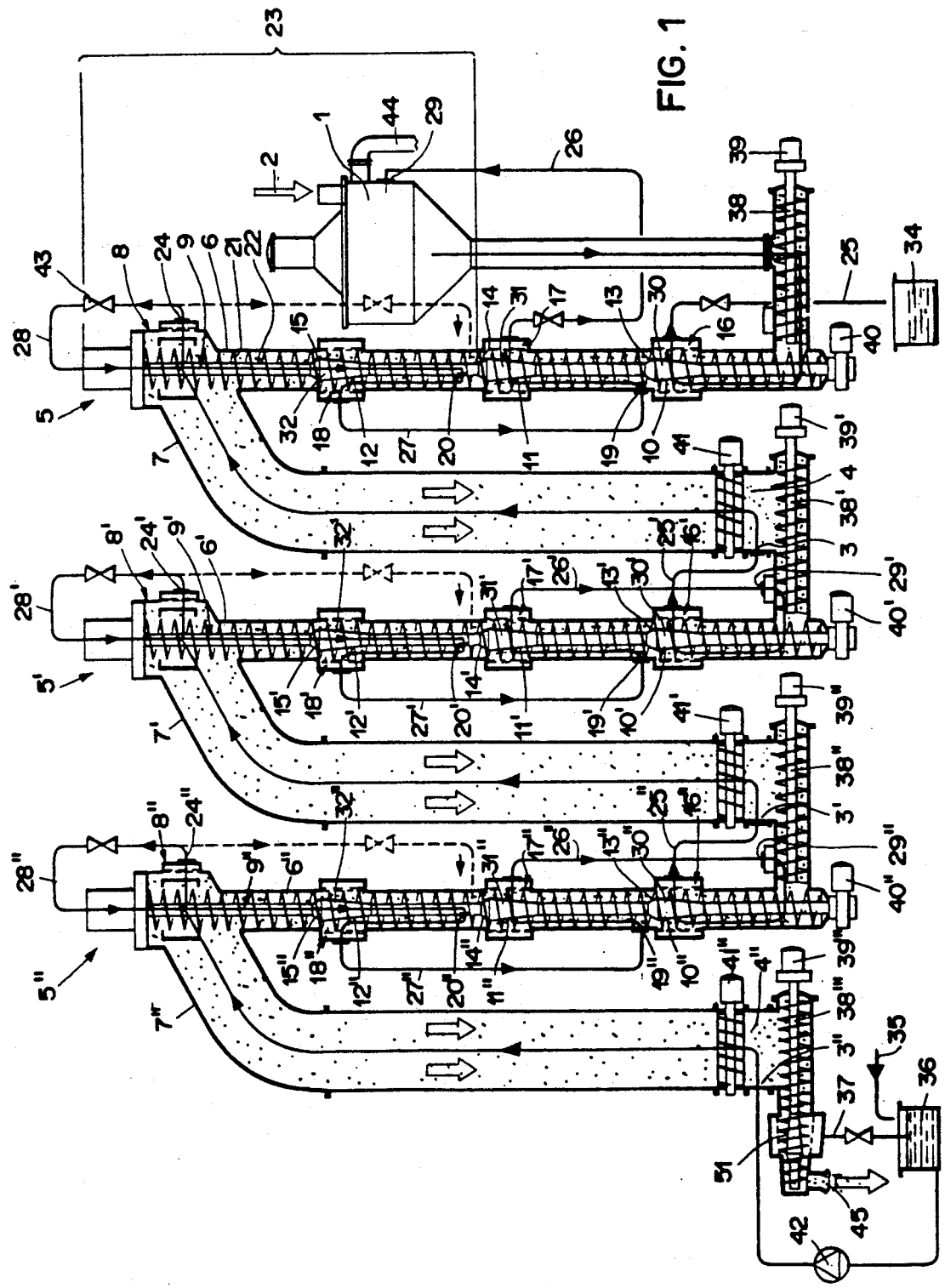

United States Patent [19]

Dragicevic

[11] Patent Number: 5,183,578

[45] Date of Patent: Feb. 2, 1993

[54] PROCESS FOR THE EXTRACTION OR FLUSHING OUT OF A SUBSTANCE FROM A HETEROGENOUS SYSTEM, AND INSTALLATION FOR CARRYING OUT THE PROCESS

[75] Inventor: Zoran Dragićević, Čačak, Yugoslavia

[73] Assignee: Laycock SA, Switzerland

[21] Appl. No.: 598,696

[22] PCT Filed: Jan. 16, 1990

[86] PCT No.: PCT/CH90/00009

§ 371 Date: Nov. 9, 1990

§ 102(e) Date: Nov. 9, 1990

[87] PCT Pub. No.: WO90/10484

PCT Pub. Date: Sep. 20, 1990

[30] Foreign Application Priority Data

Mar. 10, 1989 [YU] Yugoslavia ............................ 502/89

[51] Int. Cl.$^5$ ................................................ B01D 11/02
[52] U.S. Cl. ..................................... 210/773; 210/767;
210/511; 100/145; 127/5; 127/7; 162/18
[58] Field of Search ............... 210/767, 770, 772, 779,
210/414, 511, 773; 100/117, 145; 127/45, 5, 6, 7; 162/18, 56

[56] References Cited

U.S. PATENT DOCUMENTS

| | | | |
|---|---|---|---|
| 623,892 | 4/1899 | Fairley | 127/7 |
| 1,604,650 | 11/1924 | Manning | 210/770 |
| 1,604,651 | 4/1925 | Manning | 210/414 |
| 2,637,666 | 1/1950 | Langen | 127/7 |
| 2,928,760 | 12/1954 | Christoffersen et al. | 127/5 |
| 3,313,653 | 10/1964 | Jung | 127/45 |
| 3,523,799 | 11/1966 | Rigby | 100/117 |
| 3,953,224 | 4/1976 | Dietzel et al. | 127/5 |

Primary Examiner—Robert A. Dawson
Assistant Examiner—Ana M. Fortuna
Attorney, Agent, or Firm—Honigman Miller Schwartz and Cohn

[57] ABSTRACT

The process and the continuously working installation are intended for the extraction or flushing out of a substance from a heterogenous system with a solid phase of fibrous or granular material by means of a liquid, which, in the course of the process, forms a liquid phase which is increasingly loaded with the substance to be extracted or flushed out. The solid phase (2) is advanced in the installation with conveyor means (9, 9', 9''). The liquid phase (4, 4', 4'') passes through the installation substantially in the opposite direction to the solid phase. Elements (30, 31, 32, 30', 31', 32', 30'', 31'', 32'') for compressing and decompressing the solid phase (2) are disposed along the path of the solid phase (2) through the installation which may consist of several treatment stages (5, 5', 5'') connected in series. Means for drawing off at least a part of the liquid phase are foreseen in each of the compression zones. The liquid phase drawn off is fed back each time to the solid phase at a location which lies counter to the flow direction of the solid phase and closer to the feed device (1) of the latter than the corresponding drawing-off means.

20 Claims, 3 Drawing Sheets

PROCESS FOR THE EXTRACTION OR FLUSHING OUT OF A SUBSTANCE FROM A HETEROGENOUS SYSTEM, AND INSTALLATION FOR CARRYING OUT THE PROCESS

TECHNICAL FIELD

The present invention concerns a process for the extraction or flushing out of a substance from a heterogenous system and to a continuously operating extraction or flushing installation for carrying out the process.

STATE OF THE ART

In the chemical industry the treatment of heterogenous systems, regardless of whether it is a question of physical separations, extractions, flushing processes, chemical reactions or similar, is either carried out discontinuously or in stages in different devices, or, on the other hand, continuously or uninterrupted in a single device intended therefor. In comparison with the continuous processes, the stagewise processes usually have various disadvantages such as longer processing time, greater energy consumption, smaller specific output and procedures which are difficult to automate.

A device for the continuous treatment of heterogenous systems, in particular for extracting substances from a solid phase of granular material by means of a solvent, has for example become known of as a screw-type extractor by Hildebrand (Lueger, Lexikon der Technik, Volume 16, 1970 Deutsche Verlags-Anstalt Stuttgart). The extractor contains three conveyor screws turning at different speeds, in a U-shaped arrangement. The material is advanced downwards by the first screw, horizontally by the second and upwards again by the third. The solvent flows in the opposite direction. The second, horizontally disposed screw turns slower than the other screws so that the solid phase is accumulated.

Observations made whilst working with the above-mentioned extractor show that it would be desirable to construct installations for carrying out extraction or flushing out processes in a way which would achieve a greater purity of the solid phase left over from the extracted substance and better utilization of the solvent used for the extraction, and which would also enable extraction or flushing out of a solid phase consisting of a fibrous material. By better utilization, it is meant that the solvent, which, during the course of the process, forms a liquid phase which becomes increasingly loaded with the substance to be extracted, is capable of being more heavily loaded with the substance than is usual in the known extractor.

DISCLOSURE OF THE INVENTION

It is therefore the object of this invention to propose a process and an installation for carrying out the process, in which process or installation the above-mentioned desirable improvements are included. It is apparent that in doing so, there will be additional advantages such as, for example, cost savings due to lower solvent consumption or due to a shortened process time for achieving a certain degree of purity of the solid phase. The proposed installation should not only be suitable for the extraction of substances from a solid phase, such as granular or fibrous material, but should also be equally suitable for flushing or washing out the solid phase of a heterogenous system.

This object is solved with the process comprising the following steps:
- feeding the solid phase into an extraction or flushing system with at least one conveyor pipe in which conveyor means are disposed at one end of the conveyor pipe;
- feeding into the other end of the conveyor pipe a liquid which, during the course of the process, forms a liquid phase which becomes increasingly charged with the substance to be extracted or flushed out;
- advancing the solid phase in one direction by the conveyor means in the conveyor pipe while traversing the liquid phase through the conveyor pipe in a direction opposite to the solid phase;
- compacting the solid phase in at least one compaction zone as the solid phase passes through the conveyor pipe;
- drawing off at least part of the liquid phase near the compaction zone;
- decompacting the solid phase again in a zone past the compaction zone; and,
- introducing liquid phase again which is less charged with the substance to be extracted or flushed out than the liquid phase drawn off near the compaction zone;

and with a continuously working extraction or flushing installation comprising:
- at least one treatment stage with a conveyor pipe, in which a conveyor means is disposed, and a sloping pipe adjoining the conveyor pipe;
- a device for supplying a heterogenous system with a solid phase of fibrous or granular materia;
- an additional device for supplying liquid or a liquid phase, the additional device being disposed near an end portion of the conveyor pipe, the device for supplying the solid phase being disposed at the other end of the conveyor pipe;
- at least one compression zone and one subsequent decompression zone in the conveyor pipe along the path of the solid phase,
- means for drawing off at least part of the liquid phase in the region of the compression zone; and,
- means for supplying liquid phase in the region of the decompression zone.

The effectiveness of the process and the installation for carrying out the process is based on the fact that compression or crush zones, decompression or expansion zones and mix zones follow alternately and continuously, liquid phase being preferably drawn off outwards from the heterogenous system in crush zones and fed back to the heterogenous system at locations, preferably at expansion zones, with a liquid phase which is already more heavily loaded. The possibilities for using an installation according to the invention in the chemical and other industries are extremely varied. Preferred and/or suitable areas of use are, for example:
- in the chemical industry to obtain cellulose derivates,
- in the textile industry for washing, bleaching, impregnating and dyeing,
- in pharmaceutics in the continuous synthesis of pharmaceutical products,
- or generally, for extracting and washing out substances from roots, barks, herbs, grain, tea, coffee, barley in the beer industry and in many other cases not listed here.

SHORT DESCRIPTION OF THE DRAWINGS

Figure 2:
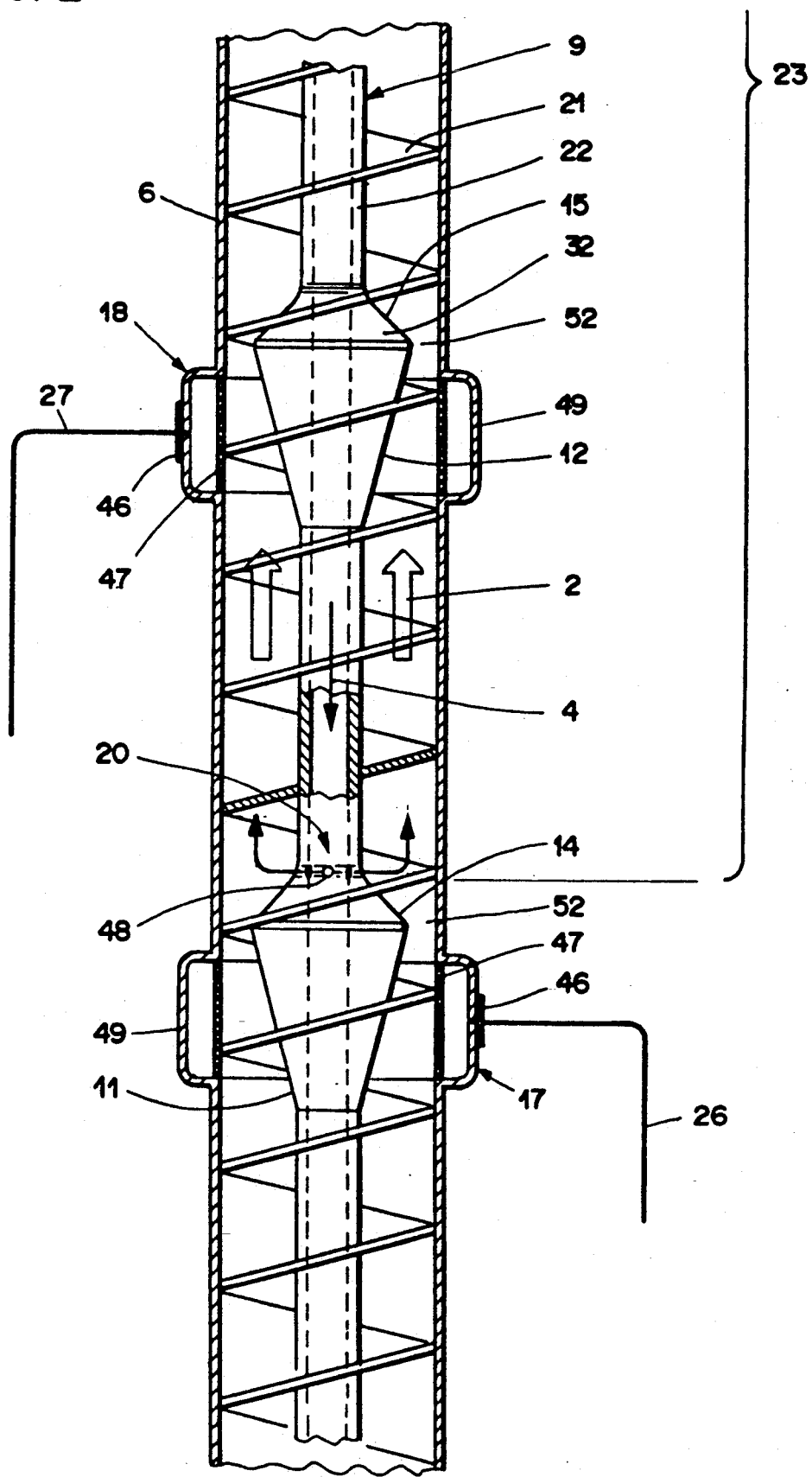
Figure 3:
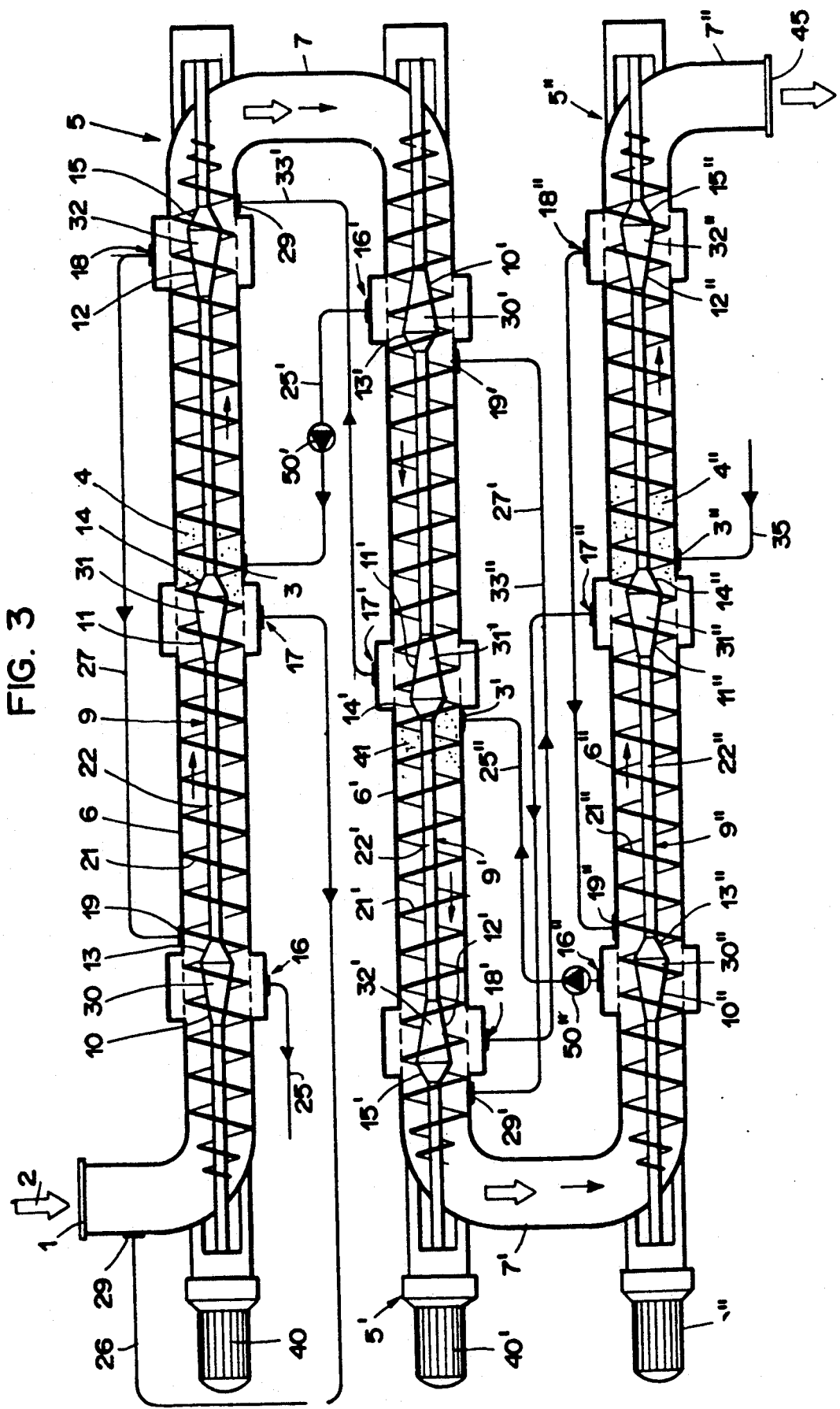

Preferred forms of embodiment of the invention will be explained in more detail below, by way of example. The figures show:

FIG. 1 a schematic representation of a first form of embodiment of an installation according to the present invention, FIG. 2 a detailed representation of compression and decompression zones as used in the installation according to the invention and, FIG. 3 a schematic representation of a second form of embodiment of an installation according to the invention.

THE BEST WAY OF CARRYING OUT THE INVENTION

The two forms of embodiment of the installations according to the invention are described below with reference to the figures. The references were selected so that components of the same design or components serving the same purpose bear the same references in both forms of embodiment.

The first form of embodiment of an extraction or flushing installation according to the invention is shown schematically in FIG. 1. As the name says, and as already mentioned previously, it is possible to carry out both extraction and washing or flushing processes with the installation. To this end, a heterogenous system consisting of a solid phase of fibrous or granular material 2 is fed into a funnel-shaped feed device 1. The funnel-shaped feed device is disposed at one end of the installation which is substantially constructed of pipes 6, 7, 6', 7', 6", 7", connected one behind the other. The heterogenous system which has been freed of an undesired substance, leaves the installation via a discharge opening 45 at the other end of the pipe-shaped construction. In case of an extraction, a solvent is fed into a reservoir 36 via a liquid feed pipe 35 and from there it is brought by means of a pump 42 via another feed device 3" into the pipe-shaped construction of the installation. This said additional feed device 3", via which is introduced the solvent which is not loaded with the substance to be extracted, is located in the area of the discharge opening 45. The solvent passes through the installation in the opposite direction to the heterogenous system, i.e. seen in the direction in which the latter is advanced, from the end to the beginning of the installation. In doing so, the solvent slowly turns into a liquid phase which becomes increasingly loaded with the substance extracted from the heterogenous system. The very heavily loaded liquid phase leaves the installation through first draw-off means 16 via an outlet pipe 25 to reach a collection tank 34. The flushing process proceeds in a similar way. The heterogenous system 2, which is introduced into the funnel-shaped feed device 1, usually comprises in this case in addition to the solid phase, a liquid phase or a so-called carrier liquid. A flushing liquid is introduced into the installation via the additional feed device 3" as a so-called receiver liquid. In the course of the washing or flushing process, which proceeds in the manner already described, the original liquid phase or carrier liquid is replaced by the flushing agent or receiver liquid.

As can be seen from FIG. 1, the installation of the invention is constructed essentially of three treatment stages 5, 5', 5". Each of the treatment stages has practically the same parts. These are therefore also designated by the same reference numerals although corresponding parts in the first treatment stage 5 are written with no dash, in the second treatment stage 5' with one dash and in the third treatment stage 5" with two dashes in addition. It will therefore be sufficient to explain the features with reference, for example, to the first treatment stage 5. As already mentioned, the heterogenous system 2 is introduced into the funnel-shaped feed device 1. Via a pipe connected to the feed device 1, but not further specified, the heterogenous system passes into a horizontal transport screw 38, driven by a drive engine 39. Connecting with the horizontal transport screw there is a conveyor pipe 6, in which a conveyor means are located. The latter comprises a helical screw 21, which is attached to a rotating shaft 22. The rotary movement of the shaft is provided by a conveyor means drive 40. In the embodiment example shown here, the heterogenous system is advanced by the screw 9 from bottom to top in the more or less vertical conveyor pipe 6. It need not be specially mentioned and is not shown in greater detail in the figures, that a better conveyance is achieved if the inner wall of the pipe 6 is preferably provided with grooves running lengthwise. Disposed on the shaft 22 at approximately regular intervals, are three elements 30, 31, 32 which each form a compression or crush zone 10, 11, 12 and a decompression or expansion zone 13, 14, 15. The elements each substantially comprise two truncated cone-shaped constructions which face each other and will be described further on in more detail with reference to FIG. 2. By means of one of the truncated cone-shaped constructions, whose diameter increases in the flow direction of the heterogenous system, the area of the latter let through is constantly reduced in the conveyor pipe 6, causing a compression occurs. The second truncated cone-shaped construction has a diameter which decreases relatively rapidly in the flow direction of the heterogenous system. The area let through is suddenly increased for the heterogenous system, which causes a decompression or expansion of the latter. At the first member 30, a part of the liquid phase 4 is drawn off via a first drawing-off means 16, disposed in the area of the compression zone 10. This part is very heavily loaded and is not put to any further use. It is passed into the collection tank 34 via the outlet pipe 25. There is a second drawing-off means 17 in the region of the second compression zone 11 of the second element 31. Here again, at least one part of the liquid phase 4 is drawn off and added to the heterogenous system in the funnel-shaped feed device 1, for example, via a first pipe 26. The liquid phase drawn off at the second drawing-off means 17 is less loaded with the substance to be removed from the heterogenous system than that extracted at the first drawing-off means 16. A third drawing-off means 18 is disposed in the region of the third compression zone 12 of the third element 32. Here too, at least one part of the liquid phase 4 is drawn off again. Compared with the liquid phase drawn off at the second drawing-off means 17, it is less heavily loaded. Via a second pipe 27, the liquid phase drawn off last is fed back into the heterogenous system in the region of the first decompression zone 13 via a first feed device 19. As this fed-in liquid phase mixes with the heterogenous system along the way to the second drawing-off means 17, it can become loaded with more of the substance which is to be removed from the heterogenous system. Right at the top of the conveyor pipe 6, where it is connected to a sloping pipe 7, there is an extraction means 24, which, in its construction, corresponds substantially to the said drawing-off means. This and the drawing-off means 16, 17, 18 will be mentioned further on in more detail from the constructive aspect, with reference to FIG. 2. The liquid phase extracted via the extraction means passes via a third pipe 28 into a hollow area 23 of the shaft 22 and is fed back into the heterogenous system in the region of the second compression zone 14. Along the way to the third compression zone 12 the liquid phase mixes with the heterogenous system and becomes additionally loaded. It is a special feature of this form of embodiment that the third pipe 28 leads into the said hollow area 23 of the shaft 22. It would also be conceivable, as shown in FIG. 1 with a broken line only, to feed the liquid phase extracted at the extraction means 24 back to the heterogenous system via an additional external pipe. The delivery through the hollow area of the shaft 22 is effected via a second feed device 20. In the sloping pipe 7, which, as already mentioned, connects at a connection area 8 to the top of the conveyor pipe 6, the fibrous or granular material of the heterogenous system falls or sinks relatively slowly in the liquid phase 4 flowing counter thereto. A further purification process results therefrom. The cross section of the sloping pipe 7 is preferably greater than that of the conveyor pipe 6. At the bottom of the sloping pipe 7 a supply or dosing device 41 is incorporated. This serves to control the movements in the sloping pipe. Observed in the flow direction of the heterogenous system, the latter passes from the said supply or dosing device 41 into the horizontally disposed transport screw 38′ of the second treatment stage 5′. In the area between the said supply device 41 and the horizontal transport screw 38′ there is a further feed device 3 to feed in liquid phase 4′ which was extracted from the second treatment stage 5′ via its first drawing-off means 16. It is fed through a feed-back pipe 25′. As it ascends the sloping tube 7 against the heterogenous system 2 it becomes increasingly loaded with the substance which is to be extracted or flushed out.

Referring back to the funnel-shaped feed device 1, it should further be noted that the first pipe 26 is connected with the feed device 1 via a third feed device 29, which essentially comprises a pipe connection fitting. An overflow 44 then comes into action if the feed device 1 is too heavily loaded. To control the procedures, automatically controllable valves or shut off faucets, of which only one is marked with the reference numeral 43, are incorporated into the various said pipes. By means of measuring elements which are not shown, with which for example phase analyses are carried out, the results of which are passed on to a control device which is also not shown, the said valves can be operated by the control device, using the results of measurements and/or previously entered control programs. The extraction and flushing processes can thereby be automated.

The second treatment stage 5′ and the third treatment stage 5″ of the installation are essentially identically constructed. From each of the first drawing-off means 16′, 16″ there is foreseen a feed pipe 25′, 25″ to feed back liquid phase via further feed devices 3, 3′ to each preceding treatment stage 5, 5′. Via each first pipe 26′, 26″ the liquid phase extracted at each of the second drawing-off means 17′, 17″ is fed back again via third feed means 29′, 29″ to the beginning of the corresponding second or third treatment stage 5′, 5″.

The sloping pipe 7″ of the third treatment stage 5″ ends in a horizontal transport screw 38′″. In a last crush stage 51 any practically unloaded liquid phase which is still present is pressed out and led via a flow off pipe 37 into the reservoir 36 where it is mixed together with the unloaded liquid introduced via the liquid supply 35, and is fed back into the installation via the pump 42.

FIG. 2 shows in greater detail the second and third drawing-off means 17, 18, the second feed device 20 and the second and third compression zone 11, 12 and the second and third decompression zone 14, 15. The conveyor pipe 6 has radial extensions 49, which protrude beyond the area of the compression zones. The drawing off means 17, 18 each consist of a connection fitting 46 which is disposed at each of the extensions and is intended to connect with the corresponding pipe 26, 27. The drawing off means inside the conveyor pipe 6 also have a hollow cylinder-shaped filter cartridge 47 disposed in each of the said extensions 49. By means of this filter cartridge, liquid phase can be filtered out and drawn off via the pipes 26, 27. The compression zones 11, 12 and the adjoining decompression zones 14, 15 each comprise, as already mentioned, two truncated cone-shaped constructions, which are mounted for example on the shaft 22. The two truncated cone-shaped constructions are turned towards each other. In the compression zones, the increase in the diameter of one of the truncated cone-shaped constructions causes the area let through for the solid phase in the conveyor pipe 6 to decrease relatively slowly. The solid phase is thereby compressed. After passing through the region with the smallest throughlet area, designated at each point by 52 in the said figure, the latter expands again relatively quickly through the other truncated cone-shaped construction of the decompression zone. An expansion of the solid phase 2 and of the liquid phase remaining in the conveyor pipe takes place. Via the hollow area 23 of the shaft 22 of the screw conveyor 9 less-loaded additional liquid phase 4 is introduced in the region of the second decompression zone 14 via the second feed devices 20, which comprise feed holes 48 distributed over the circumference of the circle. Instead of introducing liquid phase via the hollow area 23 of the shaft 22, it would be just as feasible, as was described with reference to FIG. 1, to fit a connection fitting to the pipe 6 to connect an external supply pipe.

FIG. 3 is a schematic representation of a second form of embodiment of an installation according to the invention. Again, it consists of three treatment stages 5, 5′, 5″. It is immediately striking that, in contrast to the first embodiment, the supply pipes 6, 6′, 6″ are essentially horizontally arranged. Each seen in the flow direction of the solid phase 2, the corresponding sloping pipe 7, 7′, 7″, which advances the solid phase to the next stage, or, in the case of the last treatment stage 5″, to the discharge opening 45, is connected to the end of each of the supply pipes. The solid phase 2 is supplied via a feed device 1 at the beginning of the first stage 5. In the pipes, essentially the same processes as already explained in detail with reference to FIG. 1 take place. Here too, compression and decompression zones are also arranged in alternating order, whereby, beginning each time with a compression zone, at least one part of the solid phase is extracted from the liquid phase, drawn off via drawing-off means and fed back again at locations where the liquid phase still remaining in the pipe system is already more heavily loaded. Such locations are always found in the direction of the extraction point which is counter to the flow direction of the solid phase. In other words, the supply location of the liquid phase is always closer to the feed device 1 of the solid phase than the corresponding extraction location. From each of the first drawing-off means 16' and 16" of the second or third treatment stage 5', 5", liquid phase 4' or 4" is introduced to the preceding treatment stage 5, 5' via each of a first feed-back pipe 25', 25", in each of which a pump 50', 50" is located. In contrast to the first described embodiment example there are second feed-back pipes 33', 33" here which feed liquid phase 4', 4" extracted from each of the second drawing-off means 17', 17" of the second and third treatment stage 5', 5" back via third feed devices 29, 29' to the corresponding preceding treatment stage 5, 5'.

The number of treatment stages 5, 5', 5" of an installation is naturally not fixed at three. Depending on the required degree of purity of the solid phase, the type of treatment and according to the materials, an installation may comprise one or several treatment stages connected in series.

I claim:

1. A process for extracting or flushing out a substance from a heterogenous system with a solid phase of fibrous or granular material, comprising the following steps:
    feeding the solid phase into an extraction or flushing system with at least one conveyor pipe in which conveyor means are disposed at one end of the conveyor pipe;
    feeding into the other end of the conveyor pipe a liquid which, during the course of the process, forms a liquid phase which becomes increasingly charged with the substance to be extracted or flushed out;
    advancing the solid phase in one direction by the conveyor means in the conveyor pipe while traversing the liquid phase through the conveyor pipe in a direction opposite to the solid phase;
    compacting the solid phase in at least one compression zone as the solid phase passes through the conveyor pipe;
    drawing off at least part of the liquid phase near the compaction zone;
    decompacting the solid phase again in a zone past the compaction zone; and,
    introducing liquid phase again which is less charged with the substance to be extracted or flushed out than the liquid phase drawn off near the compaction zone.

2. The process according to claim 1, wherein the liquid phase is introduced again into an expansion zone.

3. A continuously working extraction or flushing installation, comprising:
    at least one treatment stage with a conveyor pipe, in which a conveyor means is disposed, and a sloping pipe adjoining the conveyor pipe;
    a device for supplying a heterogenous system with a solid phase of fibrous or granular material;
    an additional device for supplying liquid or a liquid phase, the additional device being disposed near an end portion of the conveyor pipe where the sloping pipe adjoins the conveyor pipe, the device for supplying the solid phase being disposed at the other end of the conveyor pipe;
    at least one compression zone and one subsequent decompression zone in the conveyor pipe along the path of the solid phase;
    means for drawing off at least part of the liquid phase in the region of the compression zone; and
    means supplying liquid phase in the region of the decompression zone.

4. A continuously working extraction or flushing installation, comprising:
    at least one treatment stage with a conveyor pipe, in which a conveyor means is disposed, and a sloping pipe adjoining the conveyor pipe;
    a device for supplying a heterogenous system with a solid phase of fibrous or granular material;
    an additional device for supplying liquid or a liquid phase, the additional device being disposed near an end portion of the conveyor pipe where the sloping pipe adjoins the conveyor pipe, the device for supplying the solid phase being disposed at the other end of the conveyor pipe;
    at least one compression zone and one subsequent decompression zone in the conveyor pipe along the path of the solid phase;
    means for drawing off at least part of the liquid phase in the region of the compression zone;
    means for supplying liquid phase in the region of the decompression zone; and
    the cross-section of the sloping pipe being greater than the cross-section of the conveyor pipe.

5. The installation according to claim 3 or 4, wherein the conveyor means is a conveyor screw with a rotating shaft, and wherein at least one element is disposed on the shaft to form one of the compression zones and one of the decompression zones.

6. The installation according to claim 5, wherein the shaft has a hollow region running in the longitudinal direction.

7. The installation according to claim 6, wherein liquid phase drawn off or extracted may be reintroduced, via a pipe system disposed outside the conveyor pipe and the sloping pipe, or through the hollow area of the shaft, to the heterogenous system in said pipes.

8. The installation according to claim 7, wherein each of one of the ends of said pipe system is connected with one of the drawing-off means or one of the extraction means and each of the other ends of the feed back pipes and the other pipes ends in one of the other feed devices or feed means, the corresponding feed device or the corresponding feed means each being disposed at a point where the liquid phase in said pipes is more heavily charged with the substance to be extracted or flushed out than that which is introduced via the corresponding pipe.

9. The installation according to claim 5, wherein there are three compression zones and three decompression zones in the conveyor pipe and, viewed from the direction in which the heterogenous system is advanced, said zone are arranged alternately, beginning with one of the compression zones.

10. The installation according to claim 5, wherein there are several treatment stages connected in series and wherein, viewed from the direction in which the heterogenous system is advanced, liquid phase of the following stage may be supplied to each preceding stage via at least one feed back pipe.

11. The installation according to claims 3 or 4, wherein there are three compression zones and three decompression zones in the conveyor pipe and viewed from the direction in which the heterogenous system is advanced, said zones are arranged alternately, beginning with one of the compression zones.

12. The installation according to claim 4, wherein there are means for extracting liquid phase in the region in which the sloping pipe adjoins the conveyor pipe.

13. The installation according to claim 6, wherein there are means for extracting liquid phase in the region in which the sloping pipe adjoins the conveyor pipe.

14. The installation according to claim 6, wherein liquid phase drawn off or extracted may be reintroduced, via a pipe system disposed outside the conveyor pipe and the sloping pipe, or through the hollow area of the shaft, to the heterogenous system in said pipes.

15. The installation according to claim 11, wherein there are several treatment stages connected in series and wherein, viewed from the direction in which the heterogenous system is advanced, liquid phase of the following stage may be supplied to each preceding stage via at least one feed back pipe.

16. The installation according to claims 3 or 4, wherein means are provided for extracting liquid phase in the region in which the sloping pipe adjoins the conveyor pipe.

17. The installation according to claim 16, wherein liquid phase drawn off or extracted may be reintroduced, via a pipe system disposed outside the conveyor pipe and the sloping pipe, or through the hollow area of the shaft, to the heterogenous system in said pipes.

18. The installation according to claim 7, wherein there are several treatment stages connected in series and wherein, viewed from the direction in which the heterogenous system is advanced, liquid phase of the following stage may be supplied to each preceding stage via at least one feed back pipe.

19. The installation according to claim 3 or 4, wherein there are several treatment stages connected in series and wherein, viewed from the direction in which the heterogenous system is advanced, liquid phase of the following stage may be supplied to each preceding stage via at least one feed back pipe.

20. The installation according to claim 19, wherein each of one of the ends of the feed back pipes and the other pipes is connected with one of the drawing-off means or one of the extraction means and each of the other ends of the feed back pipes and the other pipes ends in one of the other feed devices or feed means, the corresponding feed device or the corresponding feed means each being disposed at a point where the liquid phase in said pipes is more heavily charged with the substance to be extracted or flushed out than that which is introduced via the corresponding pipe.

* * * * *

UNITED STATES PATENT AND TRADEMARK OFFICE
CERTIFICATE OF CORRECTION

PATENT NO. : 5,183,578
DATED : February 2, 1993
INVENTOR(S) : Zoran Dragicevic

It is certified that error appears in the above-indentified patent and that said Letters Patent is hereby corrected as shown below:

On the Title page, item [57], Abstract, line 8, "the liquid" should be -- The liquid --.

Column 8, line 3, after "means" insert -- for --; line 55 (line 5 of claim 9), "zone" should be -- zones --.

Column 9, line 4 (line 1 of claim 13), "claim 6," should be -- claim 11, --; line 7 (line 1 of claim 14), "claim 6," should be -- claim 11, --.

Column 10, line 3 (line 1 of claim 18), "claim 7," should be -- claim 16, --.

Signed and Sealed this

Nineteenth Day of April, 1994

Attest:

BRUCE LEHMAN

Attesting Officer

Commissioner of Patents and Trademarks